US012748412B2

(12) United States Patent
Srivastava et al.

(10) Patent No.: US 12,748,412 B2
(45) Date of Patent: Sep. 29, 2026

(54) INDUSTRIAL AUTONOMOUS SYSTEM PERFORMANCE EVALUATION

(71) Applicant: HONEYWELL INTERNATIONAL INC., Charlotte, NC (US)

(72) Inventors: Viraj Srivastava, Bengaluru (IN); Praveen Sam, Cypress, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 436 days.

(21) Appl. No.: 18/232,358

(22) Filed: Aug. 10, 2023

(65) Prior Publication Data

US 2025/0053165 A1 Feb. 13, 2025

(51) Int. Cl.
*G05B 23/02* (2006.01)
*G05B 19/418* (2006.01)

(52) U.S. Cl.
CPC ....... *G05B 23/0235* (2013.01); *G05B 23/027* (2013.01); *G05B 23/0283* (2013.01); *G05B 19/4184* (2013.01); *G05B 23/0286* (2013.01); *G05B 23/0289* (2013.01); *G05B 23/0294* (2013.01)

(58) Field of Classification Search
CPC .............. G05B 23/0235; G05B 23/027; G05B 23/0283; G05B 23/0286; G05B 19/4184; G05B 23/0294; G05B 23/0289
See application file for complete search history.

(56) References Cited

U.S. PATENT DOCUMENTS

| | | | | |
|---|---|---|---|---|
| 10,699,556 | B1 * | 6/2020 | Ganapathi | G08B 29/16 |
| 2016/0330225 | A1 * | 11/2016 | Kroyzer | G06N 20/00 |
| 2022/0327908 | A1 * | 10/2022 | Menzel | G08B 29/04 |
| 2022/0365525 | A1 * | 11/2022 | Minisankar | G06N 20/00 |

FOREIGN PATENT DOCUMENTS

| | | | | |
|---|---|---|---|---|
| WO | WO-2013041440 A1 * | 3/2013 | | G05B 23/0248 |

* cited by examiner

*Primary Examiner* — Christian T Bryant
(74) *Attorney, Agent, or Firm* — Alston & Bird LLP

(57) ABSTRACT

Techniques for evaluating performance of an industrial autonomous system are described. In an example, a corrective action initiated by the industrial autonomous system is identified, where the corrective action is initiated for responding to an alarm event associated with an equipment at an industrial facility. The alarm event is generated upon detection of a deviation beyond threshold, where the deviation is associated with at least one operation parameter of the equipment. Further, the industrial autonomous system is utilized for monitoring operation parameters of the equipment and initiating the corrective action by modifying a first set of operation parameters. The corrective action is then compared with a benchmark corrective action. A performance rating of the industrial autonomous system is then generated based on a difference between the corrective action and the benchmark corrective action.

20 Claims, 10 Drawing Sheets

INDUSTRIAL AUTONOMOUS SYSTEM PERFORMANCE EVALUATION

BACKGROUND

Industrial facilities are made to operate continuously for longer durations to increase production and reduce costs involved in halting and resuming operations in such facilities. To ensure continuous operability of such facilities, various operators are employed who are tasked with handling operations of equipment being utilized in such facilities. In addition to handling the operations, such operators are also tasked with monitoring the equipment and performing troubleshooting in case of generation of alarm events related to the equipment. The alarms events are generated when an operation parameter of the equipment deviates beyond a threshold.

SUMMARY

In an example, a method for evaluating performance of an industrial autonomous system is described. In an example, an occurrence of an alarm event associated with an equipment at an industrial facility is detected, where the alarm event is generated upon the detection of a deviation beyond a threshold, and where the deviation is associated with an operation parameter of the equipment. A corrective action is then initiated by modifying a first set of operation parameters of the equipment, where the corrective action is initiated in response to the alarm event. The corrective action is then compared with a benchmark corrective action. A performance rating of the industrial autonomous system is then generated based on a difference between the corrective action and the benchmark corrective action.

In another example, a system to evaluate performance of an industrial autonomous system is described. The system includes an identification engine to identify a corrective action initiated by the industrial autonomous system for responding to an alarm event associated with an equipment at an industrial facility. The alarm event is generated upon detection of a deviation beyond threshold, wherein the deviation is associated with at least one operation parameter of the equipment. Further, the industrial autonomous system is utilized for monitoring operation parameters associated with the equipment and initiating the corrective action by modifying a first set of operation parameters. The system further includes an assessment engine coupled to the identification engine to compare the corrective action with a benchmark corrective action. A rating engine coupled to the assessment engine is further included in the system, where the rating engine is to generate a performance rating of the industrial autonomous system based on a difference between the corrective action and the benchmark corrective action.

In yet another example, a non-transitory computer readable medium for evaluating performance of an industrial autonomous system is described. The non-transitory computer readable medium comprises computer-readable instructions that when executed cause a processing resource of a computing device to identify a first corrective action initiated by a first industrial autonomous system for responding to an alarm event associated with an equipment at an industrial facility. The first industrial autonomous system is utilized for monitoring operation parameters associated with the equipment and initiating the first corrective action by modifying a first set of operation parameters of the equipment. Further, the alarm event is generated upon detection of a deviation beyond threshold, where the deviation is associated with at least one operation parameter of the equipment. The instructions further cause the processing resource to determine a count of second corrective actions initiated by a second industrial autonomous system coupled to the first industrial autonomous system in response to at least one second alarm event generated in response to initiation of the first corrective action. Further, the instructions cause the processing resource to compare the count of the second corrective actions to a benchmark count. the instructions cause the processing resource. The instruction further cause the processing resource to generate a performance rating of the first industrial autonomous system.

Figure 1:
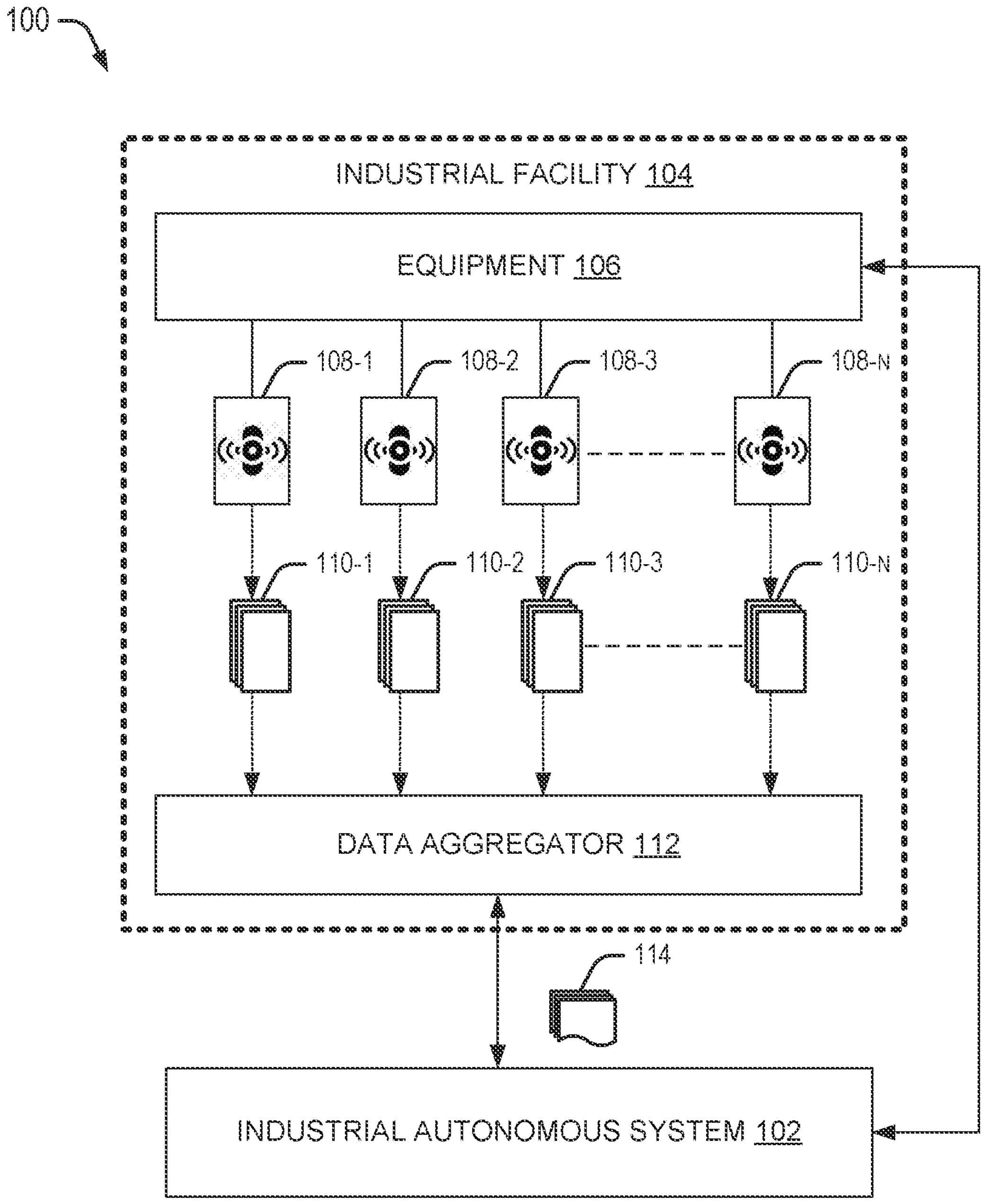
FIG. 1 illustrates an environment for implementing an industrial autonomous system, in accordance with an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

There are certain industrial facilities where deployment of human operators may not be feasible. For instance, in iron and steel factories, it may not be feasible to deploy human operators near furnaces due to extremely high temperatures in vicinity of such furnaces. Therefore, in many industrial facilities, autonomous systems are utilized for monitoring and troubleshooting in case of generation of alarm events related to the equipment. Such industrial autonomous systems are usually configured based on a set of predefined rules, where the set of predefined rules include possible alarm events along with corresponding resolutions to such alarm events. In some situations, such autonomous systems also utilize machine learning models which are trained regularly so that the autonomous systems can dynamically provide automatic and improved resolutions to the alarm events.

While such autonomous systems facilitate automatic resolution to the alarm events, there is a possibility that the provided resolution may not be effective. For instance, there may be a situation when a time taken by an autonomous system to initiate resolution after occurrence of an alarm event may be higher than a desired value. In such a situation, the equipment may keep operating with deviated operating parameters for a longer duration, thereby affecting quality and quantity of goods being produced in the industrial facility. For instance, if such a situation were to occur with a furnace installed at an iron and steel factory, the furnace would keep working with the deviated operating parameters for longer durations, thereby affecting the efficiency involved in smelting of metal ores.

According to examples of the present subject matter, techniques for evaluating performance of an industrial autonomous system are described.

In an example implementation, occurrence of an alarm event related to an equipment at an industrial facility may be detected. The alarm event may be generated upon detection of a deviation associated with an operation parameter of the equipment to be beyond a threshold. In response to generation of the alarm event, a corrective action may be initiated by modifying a first set of operation parameters of the equipment. The corrective action may then be compared to a benchmark corrective action. Based on the comparison, a performance rating of the industrial autonomous system may be generated based on a difference between the corrective action and the benchmark corrective action. In an example, a high-performance rating may indicate better conformance between the corrective action and the benchmark corrective action.

In an example, once the performance rating has been provided to the industrial autonomous system, a second corrective action initiated by a second industrial autonomous system coupled to the industrial autonomous system may be identified. The second corrective action may be initiated for responding to a second alarm event related to the equipment. Further, the second corrective action may be initiated in response to occurrence of a second alarm event, where the second alarm event has occurred in response to initiation of the corrective action. The second corrective action may involve modification of a second set of operation parameters of the equipment. In the example, a count of operation parameters within the second set of operation parameters may be ascertained to be beyond a threshold. Based on the ascertaining, an updated performance rating of the industrial autonomous system may be generated.

Comparing the corrective action initiated by the industrial autonomous system for responding to the alarm event with respect to the benchmark corrective action facilitates determination of the effectiveness of the industrial autonomous system while responding to the alarm event. Accordingly, if it is determined that the industrial autonomous system's performance has degraded, appropriate actions, such as reconfiguration of the set of predefined rules for responding to alarm events or conditioning of training data for the machine learning models configured to provide resolutions to the alarm events, may be performed to optimize the performance of the industrial autonomous system.

The above techniques are further described with reference to FIGS. 1 to 10. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates an environment 100 for implementing an industrial autonomous system 102, in accordance with an example of the present subject matter. The environment 100 may include an industrial facility 104, where the industrial facility 104 may have an equipment 106. In an example, the industrial autonomous system 102 may be configured to monitor operations of the equipment 106 for detecting occurrence of alarms events associated with the equipment 106 and initiate corrective actions for mitigating the alarm events. It would be noted that an alarm event associated with the equipment is generated when it is detected that a deviation in an operational parameter of the equipment is beyond a threshold.

Examples of the industrial facility 104 may include, but are not limited to, iron and steel factories, oil refineries, chemical factories, and pharmaceutical factories. Further, examples of the equipment 106 at the industrial facility 104 may vary based on a type of industrial facility 104. For instance, when the industrial facility 104 is an iron and steel factory, examples of the equipment 106 may include, but are not limited to, hot coil conveyers, de-coiler machine, rotary kiln and cooler, continuous casting machine, cold box equipment, air purification vessel, roller table, ladle turret, and waste heat recovery boiler. Further, when the industrial facility 104 is a chemical factory, examples of the equipment 106 may include, but are not limited to, heat exchangers, centrifugal machines, hot air generators, chemical reactor vessels, mixing tanks, and chemical storage tanks.

The environment 100 may include various sensors 108-1, 108-2, 108-3, . . . , 108-N mounted onto or coupled to the equipment 106 for monitoring various operational parameters of the equipment 106. A type of sensor mounted onto the equipment 106 may vary based on the parameter to be monitored. For instance, in an example, when the industrial facility 104 is the iron and steel factory, the equipment 106 is a hot coil conveyer, and the parameter to be monitored is temperature of a part of the hot coil conveyer, a temperature sensor may be mounted onto the hot coil conveyer. In another example, when the industrial facility 104 is the chemical factory, the equipment 106 is a centrifugal machine, and the parameter to be monitored is rotational speed of the centrifugal machine, a rotational speed sensor may be mounted onto the centrifugal machine.

The environment 100 may further include a data aggregator 112, communicatively coupled to the sensors 108-1, 108-2, 108-3, . . . , 108-N to receive sensor data 110-1, 110-2, 110-3, . . . , 110-N. For ease of reference, the sensors 108-1, 108-2, 108-3, . . . , 108-N and the sensor data 110-1, 110-2, 110-3, . . . , 110-N are hereinafter referred to as sensors 108 and the sensor data 110, respectively.

The data aggregator 112 may be coupled to the sensors 108 based on different communication architectures. A manner in which the data aggregator 112 receives data from the sensors 108 may vary based on a type of communication architecture. For instance, in an example, the data aggregator 112 may be coupled to the sensors 108 based on pull-type communication architecture. That is, the data aggregator 112 may send a data request to receive the sensor data 110 from the sensors 108. The data aggregator 112 may be configured to send the data request at regular time intervals. A time interval for sending the data request to the sensors 108 may be configured based on a cruciality of the sensor data 110 with respect to operation of the equipment 106. For instance, when cruciality of the sensor data, say sensor data 110-1, corresponding to the sensor 108-1, is high, the data aggregator 112 may be configured to have a shorter time interval for sending a data request to the sensor 108-1. On the other hand, when cruciality of the sensor data, say sensor data 110-2, corresponding to the sensor 108-2, is low, the data aggregator 112 may be configured to have a longer time interval for sending a data request to the sensor 108-2. In this manner, the data aggregator 112 may be configured to have different time intervals corresponding to each of the sensors 108. In response to the request, the sensors 108 may transmit the sensor data 110 to the data aggregator 112.

In another example, the data aggregator 112 may be coupled to the sensors 108 based on push-type communication architecture. That is, the sensors 108 may push the sensor data 110 to the data aggregator 112 as soon as the sensor data 110 is available at the sensors 108.

In an example, the data aggregator 112, on receiving the sensor data 110, may condition the sensor data 110 to generate conditioned sensor data 114. The data aggregator 112 may condition the sensor data 110 to ensure that the sensor data 110 conforms to a data format being utilized by the industrial autonomous system 102. The data aggregator 112 may condition the sensor data 110 using various known data conditioning mechanisms. Accordingly, the manner in which the sensor data 110 is conditioned by the data aggregator 112 is not described for the sake of brevity. The data aggregator 112 may then transmit the conditioned sensor data 114 to the industrial autonomous system 102.

The industrial autonomous system 102 may receive the conditioned sensor data 114 from the data aggregator 112, where the conditioned sensor data 114 may indicate value of various operational parameters of the equipment 106. Accordingly, the industrial autonomous system 102 may monitor various operation parameters of the equipment 106, through the received conditioned sensor data 114. The industrial autonomous system 102 may monitor the various operation parameters to detect occurrence of the alarm event associated with the equipment 106 at the industrial facility 104.

In an example, the industrial autonomous system 102 may further be controllably coupled to the equipment 106. Thus, when the industrial autonomous system 102 detects the alarm event, the industrial autonomous system 102 may initiate a corrective action for mitigating the alarm event. In the example, the industrial autonomous system 102 initiates the corrective action by modifying a first set of operation parameters of the equipment 106.

The industrial autonomous system 102 may then compare the corrective action with a benchmark corrective action. The benchmark corrective action may be indicative of an expected corrective action of the industrial autonomous system in response to the alarm event. In an example, the industrial autonomous system 102 may have access to a corrective action database (not shown) including benchmark corrective actions corresponding to various alarm events associated with the equipment. In the example, the corrective action database may be populated based on corrective actions initiated in response to generation of various alarm events associated with the equipment in the past.

The industrial autonomous system 102 may then generate a performance rating of the industrial autonomous system 102, where the performance rating may be generated based on a difference between the corrective action and the benchmark corrective action. In the example, the performance rating indicates the effectiveness of the corrective action initiated by the industrial autonomous system 102 for resolving the alarm event. It would be noted that a higher performance rating indicates better conformance between the corrective action and the benchmark corrective action.

Figure 2:
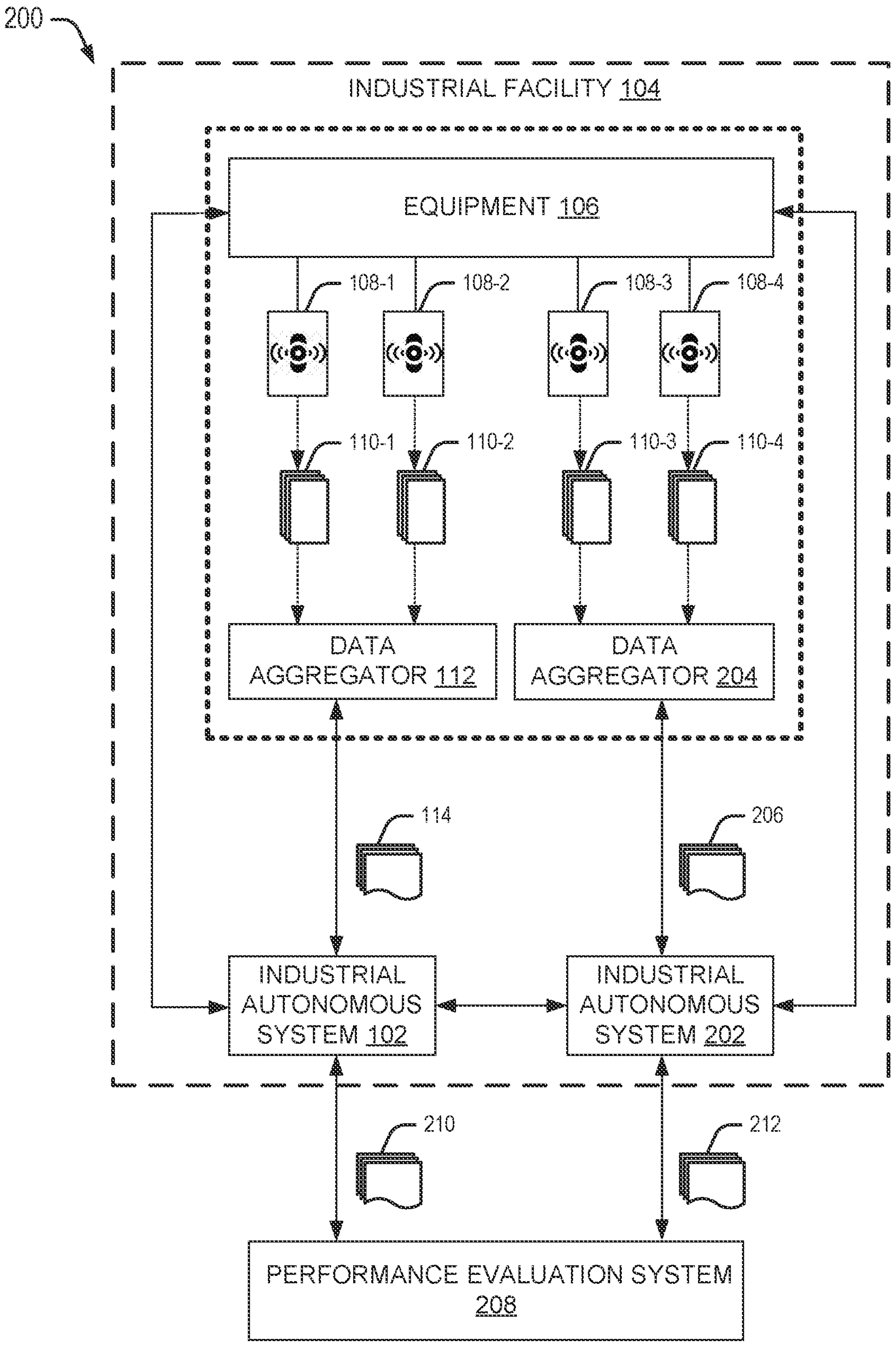
FIG. 2 illustrates an environment for implementing a performance evaluation system communicatively coupled to the industrial autonomous system, in accordance with an example of the present subject matter.

FIG. 2 illustrates another environment 200 for implementing the industrial autonomous system 102, in accordance with an example of the present subject matter.

The environment 200 may include the industrial facility 104, where the industrial facility 104 may include the equipment 106. Examples of the industrial facility 104 may include, but are not limited to, iron and steel factories, oil refineries, chemical factories, and pharmaceutical factories. Further, examples of the equipment 106 at the industrial facility 104 may vary based on a type of industrial facility 104. For instance, when the industrial facility 104 is an iron and steel factory, examples of the equipment 106 may include, but are not limited to, hot coil conveyers, de-coiler machine, rotary kiln and cooler, continuous casting machine, cold box equipment, air purification vessel, roller table, ladle turret, and waste heat recovery boiler.

In an example, the industrial autonomous system 102 may be configured to monitor operations of a first part (not shown) of the equipment 106 for detecting occurrence of first alarm events associated with the first part and initiate first corrective actions for mitigating the first alarm events. In the example, the environment 200 may include another industrial autonomous system 202 communicatively coupled to the industrial autonomous system 102. The other industrial autonomous system 202 may be configured to monitor operations of a second part (not shown) of the equipment 106 for detecting occurrence of second alarm events associated with the second part and initiate second corrective actions for mitigating the second alarm events.

The environment 200 may further include various sensors 108 mounted onto the equipment 106 for monitoring various operational parameters of the equipment 106. In an example, a first set of sensors 108-1 and 108-2 from amongst the sensors 108 may be utilized for monitoring the first part of the equipment 106. Further, a second set of sensors 108-3 and 108-4 from amongst the sensors 108 may be utilized for monitoring the second part of the equipment 106.

Further, the environment 200 may include the data aggregator 112, where the data aggregator 112 may be coupled to the first set of sensors 108-1 and 108-2. In operation, the data aggregator 112 may be configured to receive the sensor data 110-1 and 110-2 corresponding to the first part of the equipment 106.

In an example, the data aggregator 112 may be communicatively coupled to the first set of sensors 108-1 and 108-2 based on different communication architectures. A manner in which the data aggregator 112 receives data from the first set of sensors 108-1 and 108-2 may vary based on a type of communication architecture. For instance, when the data aggregator 112 is coupled to the first set of sensors 108-1 and 108-2 based on the pull-type communication architecture, the data aggregator 112 may receive sensor data 110-1 and 110-2 in response to transmission of a data request to from the first set of sensors 108-1 and 108-2. On the other hand, when the data aggregator 112 is coupled to the first set of sensors 108-1 and 108-2 based on the push-type communication architecture, the sensor data 110-1 and 110-2 may be pushed to the data aggregator 112 as soon as the sensor data 110-1 and 110-2 is available at the first set of sensors 108-1 and 108-2.

The environment 200 may further include another data aggregator 204, where the data aggregator 204 may be coupled to the second set of sensors 108-3 and 108-4. In operation, the data aggregator 204 may be configured to receive the sensor data 110-3 and 110-4 corresponding to the second part of the equipment 106. A manner in which the data aggregator 204 receives data from the second set of sensors 108-3 and 108-4 may vary based on a type of communication architecture. For instance, when the data aggregator 204 is coupled to the second set of sensors 108-3 and 108-4 based on the pull-type communication architecture, the data aggregator 204 may receive sensor data 110-3 and 110-4 on transmission of a data request to the second set of sensors 108-3 and 108-4. On the other hand, when the data aggregator 204 is coupled to the second set of sensors 108-3 and 108-4 based on the push-type communication architecture, the sensor data 110-3 and 110-4 may be pushed to the data aggregator 204 as soon as the sensor data 110-3 and 110-4 is available at the second set of sensors 108-3 and 108-4.

In an example, the data aggregator 112, on receiving the sensor data 110-1 and 110-2, may condition the sensor data 110-1 and 110-2 to generate conditioned sensor data 114. The data aggregator 112 may condition the sensor data 110-1 and 110-2 to ensure that the sensor data 110-1 and 110-2 conforms to a data format being utilized by the industrial autonomous system 102. The data aggregator 112 may then transmit the conditioned sensor data 114 to the industrial autonomous system 102.

The data aggregator 204, on receiving the sensor data 110-3 and 110-4, may also condition the sensor data 110-3 and 110-4 to generate conditioned sensor data 206. The data aggregator 204 may condition the sensor data 110-3 and 110-4 to ensure that the sensor data 110-3 and 110-4 conform to a data format being utilized by the industrial autonomous system 202. The data aggregator 204 may then transmit the conditioned sensor data 206 to the industrial autonomous system 202.

In an example implementation, the industrial autonomous system 102 may receive the conditioned sensor data 114 from the data aggregator 112, where the conditioned sensor data 114 may indicate values of various operational parameters of the first part of the equipment 106. Accordingly, the industrial autonomous system 102 may monitor various operation parameters of the first part of the equipment 106, through the received conditioned sensor data 114. The industrial autonomous system 102 may monitor the various operation parameters to detect occurrence of a first alarm event of the first part of the equipment 106. In an example, the industrial autonomous system 102 may generate the first alarm event when a deviation associated with an operation parameter of the first part of the equipment 106 is beyond a threshold.

The industrial autonomous system 102 may further be controllably coupled to the first part of the equipment 106. Thus, when the industrial autonomous system 102 detects the first alarm event, the industrial autonomous system 102 can initiate a first corrective action for mitigating the first alarm event. In the example, the industrial autonomous system 102 may initiate the corrective action by modifying a first set of operation parameters of the equipment 106.

In an example, the industrial autonomous system 202 may receive the conditioned sensor data 206 from the data aggregator 204, where the conditioned sensor data 206 is indicative of various operational parameters of the second part of the equipment 106. Accordingly, the industrial autonomous system 202 may be enabled for monitoring operation parameters of the second part of the equipment 106. The industrial autonomous system 202 may monitor the operation parameters to detect occurrence of a second alarm event associated with the second part of the equipment 106. In an example, the industrial autonomous system 202 may generate the second alarm event when a deviation associated with an operation parameter of the second part of the equipment 106 is beyond a threshold.

The industrial autonomous system 202 may further be controllably coupled to the second part of the equipment 106. Thus, when the industrial autonomous system 202 detects the second alarm event, the industrial autonomous system 202 can initiate a second corrective action for mitigating the second alarm event. In the example, the industrial autonomous system 202 initiates the second corrective action by modifying a second set of operation parameters of the equipment 106.

In an example, the industrial autonomous system 102 and the industrial autonomous system 202 may further be communicatively coupled to a performance evaluation system 208. In operation, each of the industrial autonomous system 102 and industrial autonomous system 202 may transmit information of various alarm events associated with the equipment along with corrective actions performed to mitigate the alarm events to the performance evaluation system 208.

For instance, when the first alarm event is generated and the industrial autonomous system 102 successfully mitigates the first alarm event by performing the first corrective action, the industrial autonomous system 102 may transmit information 210 of the first alarm event and the first corrective action to the performance evaluation system 208. The performance evaluation system 208, upon receiving the information 210, may store the same in a mapped relation. Similarly, when the second alarm event is generated and the industrial autonomous system 102 successfully mitigates the second alarm event by performing the second corrective action, the industrial autonomous system 202 may transmit information 212 of the second alarm event and the second corrective action to the performance evaluation system 208. The performance evaluation system 208, upon receiving the information 212, may store the same in a mapped relation.

The performance evaluation system 208 may be configured to access the mapped relation and evaluate performance of the industrial autonomous system 102. The performance evaluation system 208 may evaluate performance of the industrial autonomous system 102 in various ways.

In an example, to evaluate the performance of the first industrial autonomous system 102, the performance evaluation system 208 may access the information 210 and compare the corrective action with a benchmark corrective action. In an example, the performance evaluation system 208 may have access to a corrective action database including benchmark corrective actions corresponding to various alarm events associated with the equipment 106. In the example, the corrective action database may have been populated based on corrective actions initiated in response to generation of various alarm events associated with the equipment in the past.

In the example, the performance evaluation system 208 may generate a performance rating of the industrial autonomous system 102 based on a difference between the first corrective action and the benchmark corrective action. The performance rating indicates the effectiveness of the first corrective action initiated by the industrial autonomous system 102 for resolving the first alarm event. It would be noted that a higher performance rating indicates better conformance between the first corrective action and the benchmark corrective action.

In another example, there may be a situation where in response to initiation of the first corrective action by the industrial autonomous system 102, a deviation may arise in one or more operation parameters of the second part of the equipment 106. When it is detected that a deviation in the one or more operation parameters of the second part of the equipment 106 is beyond a threshold, one or more second alarm events may be generated. In such a situation, the industrial autonomous system 202 may initiate one or more second corrective actions to mitigate the one or more alarm events. In the example, the performance evaluation system 208 may access the information 212 and compare a count of the one or more second corrective actions with a threshold count. The performance evaluation system 208 may then generate a performance rating based on a difference between the count of the one or more second corrective actions and the threshold count.

The various other different implementation aspects related to generation of the performance rating for the industrial autonomous system 102 are further described with reference to the forthcoming figures.

Figure 3:
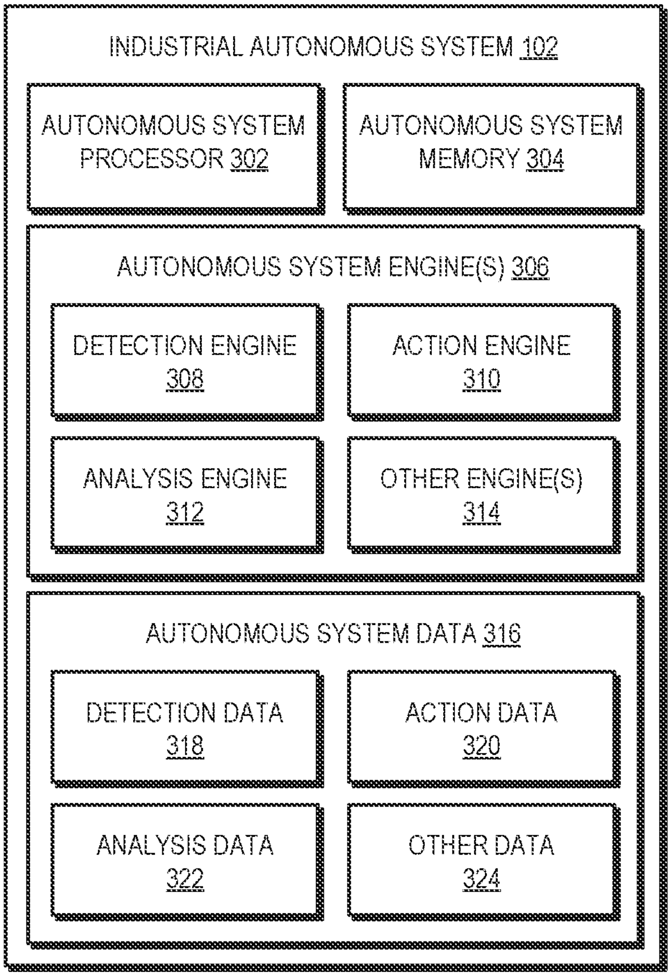
FIG. 3 illustrates schematics of the industrial autonomous system, in accordance with an example of the present subject matter.

FIG. 3 illustrates schematics of the industrial autonomous system 102, in accordance with an example of the present subject matter. As already described, the industrial autonomous system 102 may be configured to monitor operations of the equipment 106 for detecting occurrence of alarms events associated with the equipment 106 and initiate corrective actions for mitigating the alarm events.

In an example implementation, the industrial autonomous system 102 may include an autonomous system processor 302 and an autonomous system memory 304 coupled to the autonomous system processor 302. The functions of the various elements shown in the FIGs., including any functional blocks labelled as “processor(s)”, may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term “processor” would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The autonomous system memory 304 may include any computer-readable medium including, for example, volatile memory (e.g., RAM), and/or non-volatile memory (e.g., EPROM, flash memory, etc.).

The industrial autonomous system 102 may further include autonomous system engine(s) 306, where the autonomous system engine(s) 306 may include a detection engine 308, an action engine 310 coupled to the detection engine 308, an analysis engine 312 coupled to the action engine 310, and other engine(s) 314. In an example, the autonomous system engine(s) 306 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the industrial autonomous system 102 may include the machine-readable storage medium storing the instructions and the processing resource to execute the instructions. In other examples of the present subject matter, the machine-readable storage medium may be located at a different location but accessible to the industrial autonomous system 102 and the autonomous system processor 302.

The industrial autonomous system 102 may further include autonomous system data 316, that serves, amongst other things, as a repository for storing data that may be fetched, processed, received, or generated by the autonomous system engine(s) 306. In an example, the autonomous system data 310 may include detection data 318, action data 320, analysis data 322, and other data 324. In an example, the autonomous system data 316 may be stored in the autonomous system memory 304.

In an example implementation, the detection engine 308 may monitor operations of the equipment 106 to detect occurrence of an alarm event associated with the equipment 106. In an example, to monitor the operations of the equipment 106, the detection engine 308 may rely on various operation parameters of the equipment 106, where the various operation parameters may be deduced based on the sensor data 110 being received from the sensors 108. The detection engine 308 may keep monitoring the various operation parameters to detect deviations in the various operation parameters. When the detection engine 308 identifies that a deviation associated with an operation parameter from amongst the various operation parameters is beyond a threshold, the detection engine 308 may generate an alarm event. The detection engine 308 may then store an indication of the occurrence of the alarm event in the detection data 318.

The detection engine 308 may detect the deviation associated with the operation parameter and generation of the alarm event in different ways. In an example, the detection engine 308 may monitor the operation parameter of the equipment 106 for a specified time period and may identify a maximum deviation of the operation parameter from a specified value during the specified time period. In the example, the detection engine 308 may then determine that the maximum deviation is beyond a threshold. The detection engine 308 may accordingly generate the alarm event.

In another example, the detection engine 308 may monitor the operation parameter of the equipment 106 to identify a rate of deviation of the operation parameter from the specified value. In the example, the detection engine 308 may then determine that the rate of deviation is beyond a threshold. The detection engine 308 may accordingly generate the alarm event.

In yet another example, the detection engine 308 may monitor the operation parameter of the equipment 106 to identify a time period of deviation of the operation parameter from the specified value. In the example, the detection engine 308 may then determine that the time period of deviation is beyond a threshold. The detection engine 308 may accordingly generate the alarm event.

Upon detection of the generation of the alarm event, the action engine 310 may initiate a corrective action for mitigating the alarm event. In an example, the action engine 310 may initiate the corrective action by modifying a first set of operation parameters associated with the equipment 106. The action engine 310 may then record the modifications made to the first set of operation parameters and store the same in action data 320.

Once the action engine 310 has performed the corrective action, the analysis engine 312 may access the action data 320 and identify the corrective action initiated in response to the alarm event based on the first set of operation parameters. The analysis engine 312 may then compare the corrective action with a benchmark corrective action. In an example, the analysis engine 310 may have access to a corrective action database including benchmark corrective actions corresponding to different alarm events. In the example, the corrective action database may have been populated based on corrective actions performed, either by the industrial autonomous system or a facility operator, in response to generation of various alarm events in the past.

In operation, the analysis engine 312 may access the corrective action database, access the benchmark corrective action corresponding to the alarm event, and compare the corrective action with the benchmark corrective action. In an example, to compare the corrective action with the benchmark corrective action, the analysis engine 312 may compare the first set of operation parameters to a set of benchmark operation parameters, where the set of benchmark operation parameters may correspond to the benchmark corrective action.

Based on the comparison of the corrective action and the benchmark corrective action, the analysis engine 312 may compute a difference between the corrective action and the benchmark corrective action. The analysis engine 312 may then store the difference between the corrective action and the benchmark corrective action in the analysis data 322.

The analysis engine 312 may then generate a performance rating of the industrial autonomous system 102 based on the difference between the corrective action and the benchmark corrective action. The analysis engine 312 may generate the performance rating in various ways.

In an example, the analysis engine 312 may generate the performance rating based on fuzzy rating method. In the example, the analysis engine 312 may compute an absolute difference between the corrective action and the benchmark corrective action. Based on the absolute difference, the analysis engine 312 may assign a fuzzy rating between '0' to '1' in a graded manner. The analysis engine 312 may assign the fuzzy rating on the basis of a fuzzy scale. In an example, '0' on the fuzzy scale may correspond to a minimum value of absolute difference between the corrective action and the benchmark corrective action and '1' on the fuzzy scale may correspond to a threshold of the absolute difference between the corrective action and the benchmark corrective action. In the example, the threshold of the absolute difference between the corrective action and the benchmark corrective action may be user-defined. A user may further be allowed to define other grades on the fuzzy scale.

It would be noted that the performance rating may indicate the effectiveness of the corrective action initiated by the industrial autonomous system 102 for resolving the alarm event. A higher performance rating indicates better conformance between the corrective action and the benchmark corrective action. The analysis engine 312 may then store the performance rating in the analysis data 322.

In an illustrative example, the industrial autonomous system 102 may be monitoring operations of a boiler at a chemical factory. The detection engine 308 may be monitoring an operation parameter, such as a temperature of the boiler. The detection engine 308 may monitor the temperature of the boiler to monitor deviations associated therewith. In an example, the industrial autonomous system 102 may have a threshold associated with a deviation in the temperature of the boiler to be 90°. Accordingly, when the detection engine 308 detects that the temperature of the boiler has deviated beyond 90°, the detection engine 308 may generate an alarm event. In such a situation, the action engine 310 may initiate a corrective action by modifying another operation parameter of the boiler, such as an opening percentage of a fuel valve of the boiler. For instance, when the detection engine identifies that the temperature of the boiler has reduced by more than 90°, the action engine may initiate the corrective action by increasing the opening percentage of the fuel valve. It would be noted that an increase in the opening percentage of the fuel valve may increase an amount of fuel being supplied for combustion, thereby increasing the temperature of the boiler. In an example, the action engine 310 may modify the opening percentage of the fuel valve from 40% to 50%, thereby increasing the temperature of the boiler.

The analysis engine 312 may then compare the corrective action, i.e., modification of the opening percentage of the fuel valve from 40% to 50%, to a benchmark corrective action corresponding to the alarm event. In an example, the benchmark corrective action may indicate that when the temperature of the boiler deviates by 100°, the opening percentage of the fuel valve should be modified by 10%, i.e., when the temperature reduces by 100°, the opening percentage of the fuel valve should be increased by 10%. The analysis engine 312 may then compute a difference between the corrective action and the benchmark corrective action The analysis engine 312 may generate a performance rating of the industrial autonomous system 102 based on the difference between the corrective action and the benchmark corrective action.

In an example, the analysis engine 312 may further generate an updated performance rating based on one or more attributes of the corrective action. For instance, in an example, the analysis engine 312 may log a response time taken by the industrial autonomous system 102 for initiating the corrective action. In the example, the analysis engine 312 may compare the response time to a benchmark response time and compute a difference between the response time and the benchmark response time. The analysis engine 312 may accordingly generate an updated performance rating of the industrial autonomous system 102 based on the difference between the response time and the benchmark response time.

In another example, the analysis engine 312 may identify a count of operation parameters within the first set of operation parameters. The analysis engine 312 may then compare the count of operation parameters to a benchmark count of operation parameters and compute a difference between the count of operation parameters and a benchmark count. The analysis engine 312 may accordingly generate an updated performance rating of the industrial autonomous system 102 based on the difference between the count of operation parameters and a benchmark count.

In yet another example, the analysis engine 312 may identify a count of operation parameters within the first set of operation parameters modified during a specified time period. The analysis engine 312 may then compare the count of operation parameters to a benchmark count of operation parameters to be modified during the specified time period. The analysis engine 312 may accordingly generate an updated performance rating of the industrial autonomous system based on the difference between the count of operation parameters and benchmark count of operation parameters to be modified during the specified time period.

In another example, the analysis engine 312 may identify a second corrective action initiated by a second industrial autonomous system, such as the industrial autonomous system 202, coupled to the industrial autonomous system 102. In the example, the second corrective action may have been initiated for responding to a second alarm event related to the equipment 106. Further, the second alarm event may have been generated in response to modification of the first set of operation parameters by the industrial autonomous system 102. The second corrective action may be initiated by modifying a second set of operation parameters of the equipment 106. The analysis engine 312 may then identify a count of operation parameters within the second set of operation parameters.

In an example, the count of operation parameters within the second set of operation parameters may indicate an effectiveness of the corrective action initiated by the industrial autonomous system 102 in response to the alarm event. For instance, when a count of operation parameters within the second set of operation parameters is within a threshold, it may be deduced that the corrective action initiated by the industrial autonomous system 102 didn't affect operations of the equipment 106 substantially. In such a situation, it may be deduced that the effectiveness of the corrective action initiated by the industrial autonomous system 102 is high. On the other hand, when the count of operation parameters within the second set of operation parameters is beyond a threshold, it may be deduced that the corrective action initiated by the industrial autonomous system 102 affected other operation parameters of the equipment 106 substantially. In such a situation, it may be deduced that the effectiveness of the corrective action initiated by the industrial autonomous system 102 is low.

The analysis engine 312 may then ascertain if the count of operation parameters within the second set of operation parameters to be beyond the threshold. The analysis engine 312 may accordingly generate an updated performance rating of the industrial autonomous system 102. The various other different implementation aspects related to generation of the performance rating for the industrial autonomous system 102 are further described with reference to FIG. 4.

Figure 4:
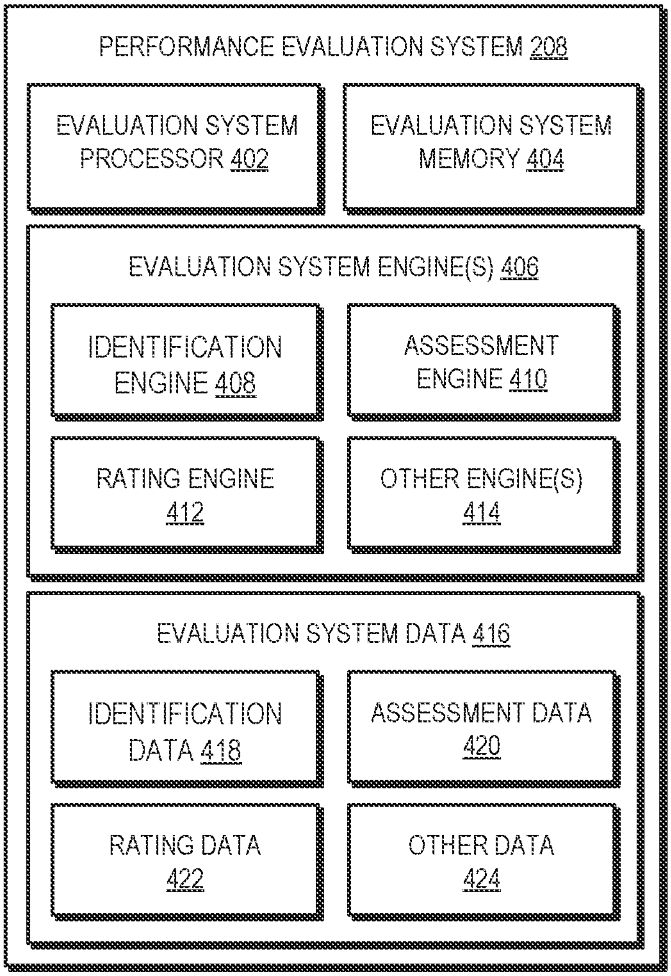
FIG. 4 illustrates schematics of the performance evaluation system, in accordance with an example of the present subject matter.

FIG. 4 illustrates the schematics of the performance evaluation system 208 for evaluating performance of the industrial autonomous system 102, in accordance with an example of the present subject matter.

The performance evaluation system 208 may include an evaluation system processor 402 and an evaluation system memory 404 coupled to the evaluation system processor 402. The functions of the various elements shown in the FIGs., including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The evaluation system memory 404 may include any computer-readable medium including, for example, volatile memory (e.g., RAM), and/or non-volatile memory (e.g., EPROM, flash memory, etc.).

The performance evaluation system 208 may further include evaluation system engine(s) 406, where the evaluation system engine(s) 406 may include an identification engine 408, an assessment engine 410 coupled to the identification engine 408, a rating engine 412 coupled to the assessment engine 410, and other engine(s) 414. In an example, the evaluation system engine(s) 406 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the performance evaluation system 208 may include the machine-readable storage medium storing the instructions and the processing resource to execute the instructions. In other examples of the present subject matter, the machine-readable storage medium may be located at a different location but accessible to the performance evaluation system 208 and the evaluation system processor 402.

The performance evaluation system 208 may further include evaluation system data 416, that serves, amongst other things, as a repository for storing data that may be fetched, processed, received, or generated by the evaluation system engine(s) 406. In an example, the evaluation system data 416 may include identification data 418, the assessment data 420, the rating data 422, and other data 424. In an example, the evaluation system data 416 may be stored in the evaluation system memory 404.

In an example implementation, the performance evaluation system 208 may be communicatively coupled to the industrial autonomous system 102. The industrial autonomous system 102 may monitor operation parameters of the equipment 106 for detecting occurrence of alarm events and initiate one or more corrective actions on generation of the alarm events. The industrial autonomous system 102 may further transmit information of the alarm events along with the one or more corrective actions performed to mitigate the alarm events to the performance evaluation system 208.

In an example, based on the information received from the industrial autonomous system 102, the identification engine 408 may identify a corrective action initiated by the industrial autonomous system for responding to an alarm event associated with the equipment 106. In an example, the industrial autonomous system 102 may generate the alarm event when a deviation associated with an operation parameter of the equipment 106 is detected to be beyond a threshold. The industrial autonomous system 102 may initiate the corrective action for responding to the alarm event by modifying a first set of operation parameters of the equipment 106.

The assessment engine 410 may then compare the corrective action with a benchmark corrective action. The assessment engine 410 may have access to a corrective action database including benchmark corrective actions corresponding to various alarm events associated with the equipment. The corrective action database may be populated based on corrective actions initiated in response to generation of various alarm events associated with the equipment in the past. In an example, the corrective action database may be stored at the performance evaluation system 208, e.g., in the memory 404. In another example, the corrective action database may be stored at a network location accessible to the performance evaluation system 208.

In an example, to compare the corrective action with the benchmark corrective action, the assessment engine 410 may compare the first set of operation parameters to a set of benchmark operation parameters, where the set of benchmark operation parameters corresponds to the benchmark corrective action.

The assessment engine 410 may then compute a difference between the corrective action and the benchmark corrective action, Subsequently, the rating engine 412 may generate a performance rating of the industrial autonomous system 102 based on the difference between the corrective action and the benchmark corrective action.

In an example, the rating engine 412 may generate the performance rating based on a fuzzy rating method. In the example, the rating engine 412 may compute an absolute difference between the corrective action and the benchmark corrective action. Based on the absolute difference, the rating engine 412 may assign a fuzzy rating between '0' to '1' in a graded manner. The rating engine 412 may assign the fuzzy rating on the basis of a fuzzy scale. In an example, '0' on the fuzzy scale may correspond to a minimum value of absolute difference between the corrective action and the benchmark corrective action and '1' on the fuzzy scale may correspond to a threshold of the absolute difference between the corrective action and the benchmark corrective action. In the example, the threshold of the absolute difference between the corrective action and the benchmark corrective action may be user-defined.

In an example, the performance rating may be updated based on one or more attributes of the corrective action. For instance, in an example, the identification engine 408 may identify a response time taken by the industrial autonomous system 102 for initiating the corrective action. In the example, the assessment engine 410 may compare the response time to a benchmark response time and compute a difference between the response time and the benchmark response time. The rating engine 412 may accordingly generate an updated performance rating of the industrial autonomous system 102 based on the difference between the response time and the benchmark response time.

In another example, the identification engine 408 may identify a count of operation parameters within the first set of operation parameters. The assessment engine 410 may then compare the count of operation parameters to a benchmark count of operation parameters and compute a difference between the count of operation parameters and a benchmark count. The rating engine 412 may generate an updated performance rating of the industrial autonomous system 102 based on the difference between the count of operation parameters and a benchmark count.

In yet another example, the identification engine 408 may identify a count of operation parameters within the first set of operation parameters modified during a specified time period. The assessment engine 410 may compare the count of operation parameters to a benchmark count of operation parameters to be modified during the specified time period. The rating engine 412 may generate an updated performance rating of the industrial autonomous system 102 based on the difference between the count of operation parameters and benchmark count of operation parameters to be modified during the specified time period.

In another example, the industrial autonomous system 102 may be communicatively coupled to another industrial autonomous system 202. In the example, the identification engine 408 may identify a second corrective action initiated by the industrial autonomous system 202 for responding to a second alarm event related to the equipment 106. The second corrective action may be initiated in response to detection of a second alarm event initiated in response to detection of the corrective action. The second corrective action may be initiated by modifying a second set of operation parameters of the equipment 106. The assessment engine 410 may then identify a count of operation parameters within the second set of operation parameters.

In an example, the count of operation parameters within the second set of operation parameters may indicate an effectiveness of the corrective action initiated by the industrial autonomous system 102 in response to the alarm event. For instance, when a count of operation parameters within the second set of operation parameters is within a threshold, it may be deduced that the corrective action initiated by the industrial autonomous system 102 didn't affect operations of the equipment 106 substantially. In such a situation, it may be deduced that the effectiveness of the corrective action initiated by the industrial autonomous system 102 is high. On the other hand, when the count of operation parameters within the second set of operation parameters is beyond a threshold, it may be deduced that the corrective action initiated by the industrial autonomous system 102 affected other operation parameters of the equipment 106 substantially. In such a situation, it may be deduced that the effectiveness of the corrective action initiated by the industrial autonomous system 102 is low.

The assessment engine 410 may identify if a count of the second set of operation parameters is beyond a threshold. Based on the ascertaining, the rating engine 412 may generate an updated performance rating of the industrial autonomous system 102.

In another example implementation, the performance evaluation system 208 may be communicatively coupled to the industrial autonomous system 102 and the industrial autonomous system 202. The industrial autonomous system 102 may monitor the operation parameters associated with the first part of the equipment 106 for detecting occurrence of the first alarm events associated with the first part and initiate first corrective actions for mitigating the first alarm events. The industrial autonomous system 102 may further transmit information of the first alarm events along with the first corrective actions to the performance evaluation system 208.

On the other hand, the industrial autonomous system 202 may monitor the operation parameters of the second part of the equipment 106 for detecting occurrence of alarm events associated with the second part and initiate second corrective actions for mitigating the second alarm events. The industrial autonomous system 202 may further transmit information of the second alarm events along with the second corrective actions to the performance evaluation system 208.

In an example, based on the information received from the industrial autonomous system 102, the identification engine 408 may identify a first corrective action initiated by the industrial autonomous system 102 for responding to a first alarm event associated with the first part. The first alarm event may be generated when the industrial autonomous system 102 detects a deviation in an operation parameter of the first part to be beyond a threshold. The industrial autonomous system 102 may initiate the first corrective action for responding to the first alarm event by modifying a first set of operation parameters associated with the first part.

The identification engine 408 may further identify second corrective actions initiated by the industrial autonomous system 202 in response to the second alarm events. A second corrective action from amongst the second corrective actions may be initiated by modifying a second set of the operation parameters of the second part of the equipment 106. The second alarm events may be generated in response to initiation of the first corrective action.

In an example, the identification engine 408 may identify the second alarm events to be generated in response to initiation of the first corrective action based on a time delay between initiation of the first corrective action and the generation of the second alarm event. In the example, the identification engine 408 may ascertain that the second event is generated based on the initiation of the first corrective action on determining the time delay to be less than a threshold time delay.

The assessment engine 410 may then determine a count of second corrective actions and compare a count of second corrective actions to a benchmark count. Based on the comparison, the assessment engine 410 may compute a difference between the count of second corrective actions and the benchmark count. The rating engine 412 may then generate a performance rating of the industrial autonomous system 102 based on the difference between the count of second corrective actions and the benchmark count.

Figure 5:
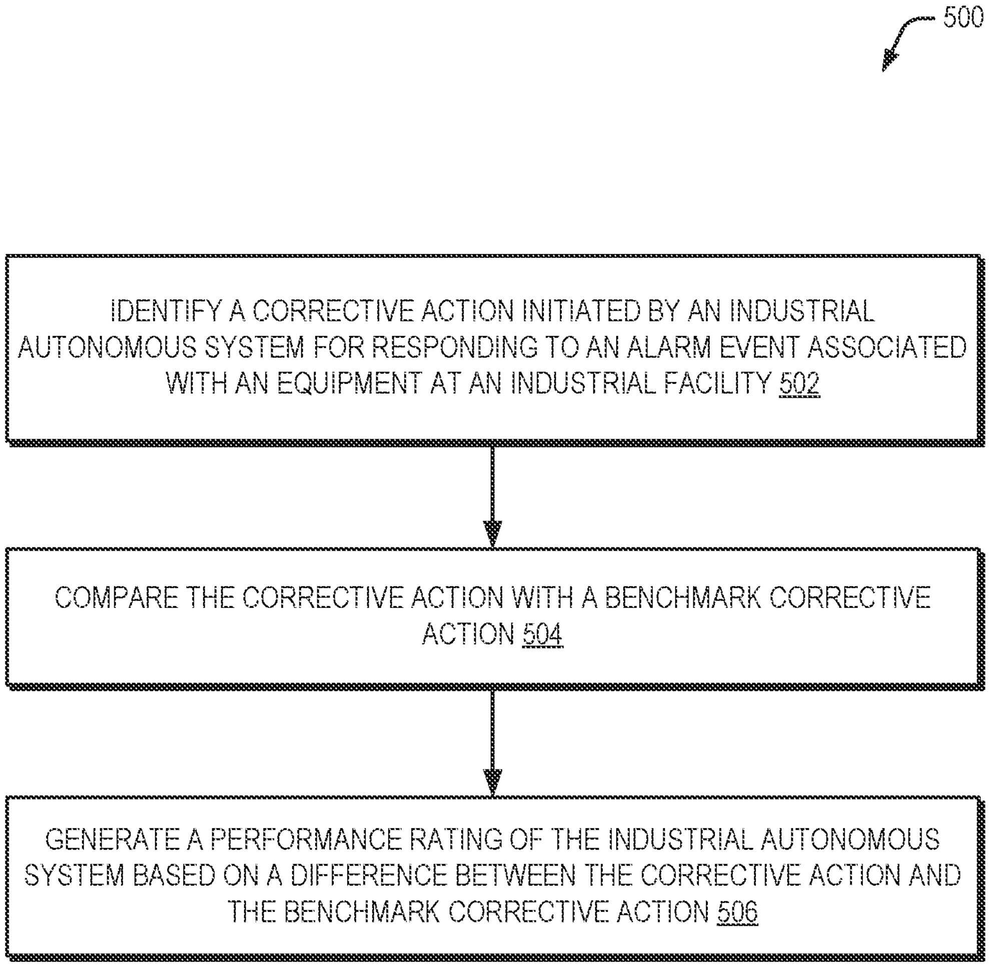
FIGS. 5 and 6 illustrate methods for evaluating performance of the industrial autonomous system, in accordance with examples of the present subject matter.
Figure 6:
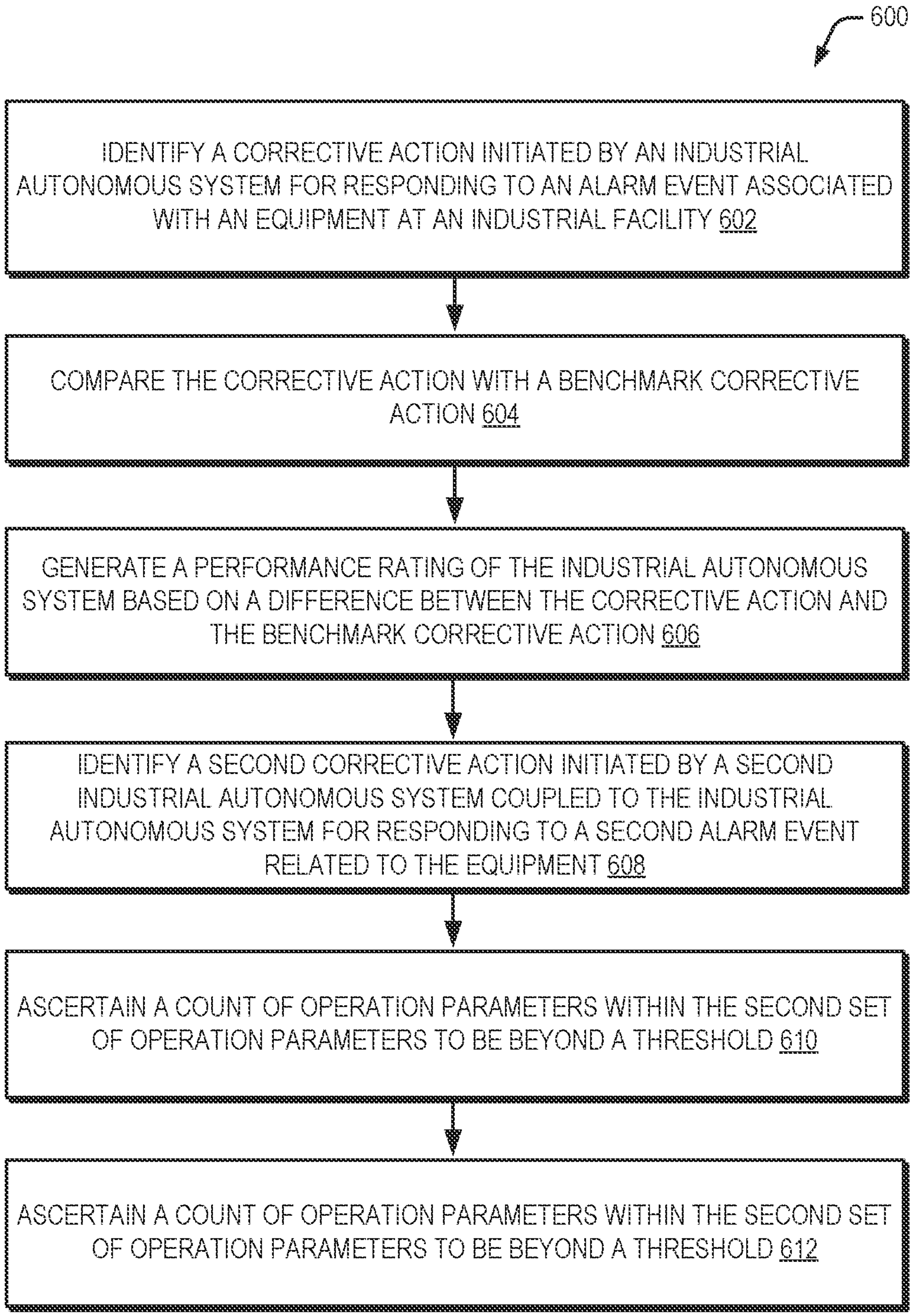

FIGS. 5 and 6 illustrate methods 500 and 600 for evaluating performance of the industrial autonomous system 102, in accordance with examples of the present subject matter. The order in which the methods are described is not intended to be construed as a limitation, and any number of the described method blocks may be combined in any order to implement the methods, or an alternative method. Further, the methods 500 and 600 may be implemented by processing resource or computing device(s) through any suitable hardware, non-transitory machine-readable instructions, or combination thereof.

It may also be understood that methods 500 and 600 may be performed by programmed computing device, such as the performance evaluation system 208, as depicted in FIG. 2 and FIG. 4. Furthermore, the methods 500 and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 500 and 600 is described below with reference to the performance evaluation system 208, as described above; other suitable systems for the execution of these methods may also be utilized. Additionally, implementation of the method is not limited to such examples.

In FIG. 5, at block 502, a corrective action initiated by an industrial autonomous system for responding to an alarm event is identified, where the alarm event is associated with an equipment at an industrial facility. The industrial autonomous system may monitor operation parameters associated with the equipment for detecting occurrence of the alarm event. The alarm event may be generated upon detection of a deviation beyond threshold, where the deviation is associated with at least one operation parameter of the equipment. In response to detection of the alarm event, the industrial autonomous system may initiate the corrective action by modifying a first set of operation parameters associated with the equipment. In an example, the corrective action may be identified by the identification engine 408 of the performance evaluation system 208.

At block 504, the corrective action is compared with a benchmark corrective action. The comparison of the corrective action with the benchmark corrective action comprises comparison of the first set of operation parameters to a set of benchmark operation parameters, where the set of benchmark operation parameters may correspond to the benchmark corrective action. In an example, the corrective action may be compared with the benchmark corrective action by the assessment engine 410 of the performance evaluation system 208.

At block 506, a performance rating is generated for the industrial autonomous system. The performance rating may be generated based on a difference between the corrective action and the benchmark corrective action. In an example, the performance rating may be generated by the rating engine 412.

In FIG. 6, at block 602, a corrective action initiated by an industrial autonomous system for responding to an alarm event is identified, where the alarm event is associated with an equipment at an industrial facility. The industrial autonomous system may monitor operation parameters associated with the equipment for detecting occurrence of the alarm event. The alarm event may be generated upon detection of a deviation beyond threshold, where the deviation is associated with at least one operation parameter of the equipment. In response to detection of the alarm event, the industrial autonomous system may initiate the corrective action by modifying a first set of operation parameters associated with the equipment. In an example, the corrective action may be identified by the identification engine 408 of the performance evaluation system 208.

At block 604, the corrective action is compared with a benchmark corrective action. The comparison of the corrective action with the benchmark corrective action comprises comparison of the first set of operation parameters to a set of benchmark operation parameters, where the set of benchmark operation parameters may correspond to the benchmark corrective action. In an example, the corrective action may be compared with the benchmark corrective action by the assessment engine 410 of the performance evaluation system 208.

At block 606, a performance rating is generated for the industrial autonomous system. The performance rating may be generated based on a difference between the corrective action and the benchmark corrective action. In an example, the performance rating may be generated by the rating engine 412.

At block 608, a second corrective action initiated by a second industrial autonomous system coupled to the industrial autonomous system may be identified. The second corrective action may be initiated in response to detection of a second alarm event generated in response to initiation of the corrective action. The second corrective action may be initiated by modifying a second set of operation parameters of the equipment. In an example, the second corrective action may be identified by the identification engine 408.

At block 610, a count of the second set of operation parameters is ascertained to be beyond a threshold. In an example, the count of second set of operating parameters may be ascertained beyond the threshold by the assessment engine 410.

At block 612, an updated performance rating of the first industrial autonomous system is generated. The updated performance rating may be generated in response to determining the second set of operation parameters to be beyond the threshold. In an example, the updated performance rating may be generated by the rating engine 412.

Figure 7:
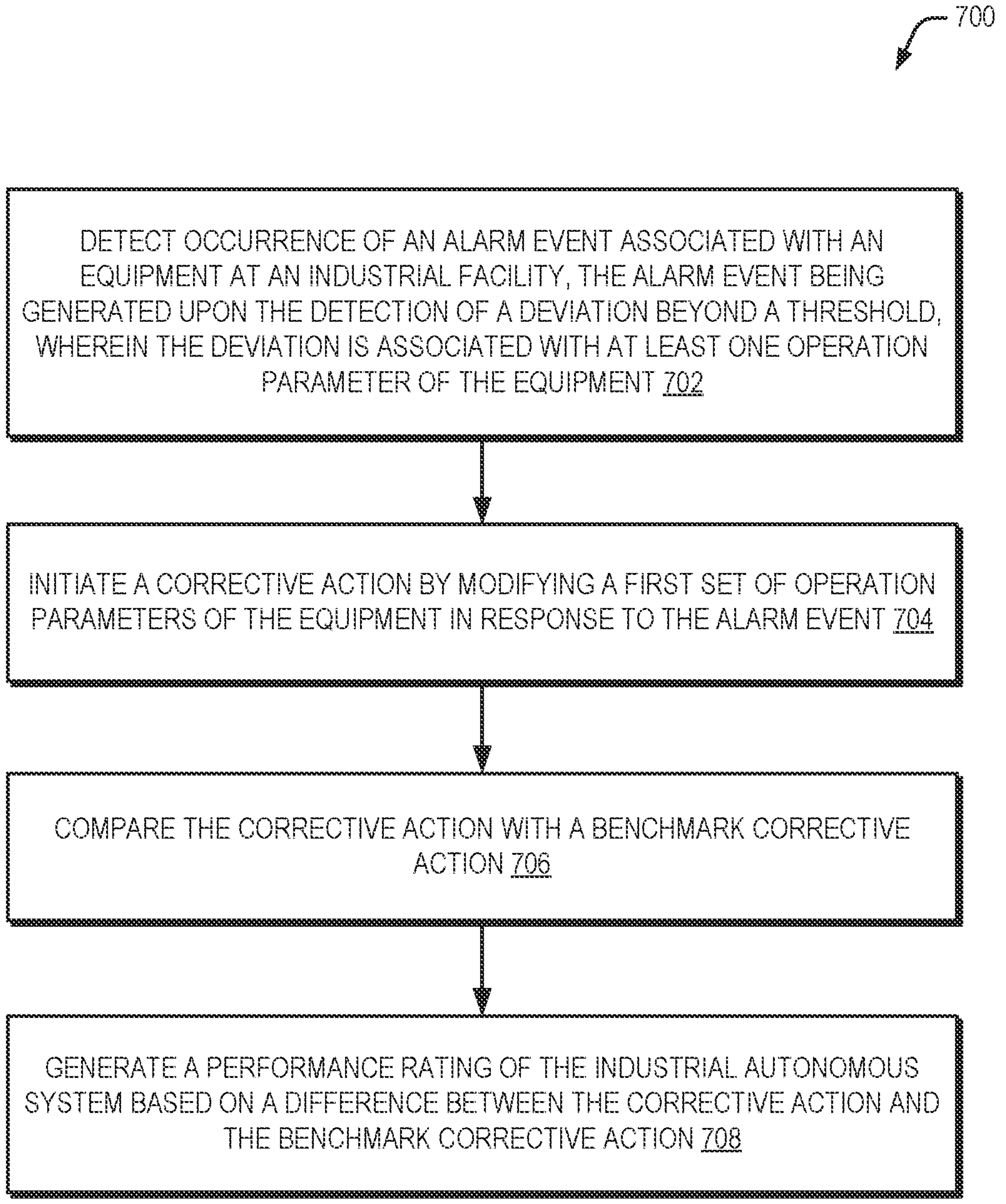
FIGS. 7 and 8 illustrate methods for evaluating performance of the industrial autonomous system, in accordance with other examples of the present subject matter.
Figure 8:
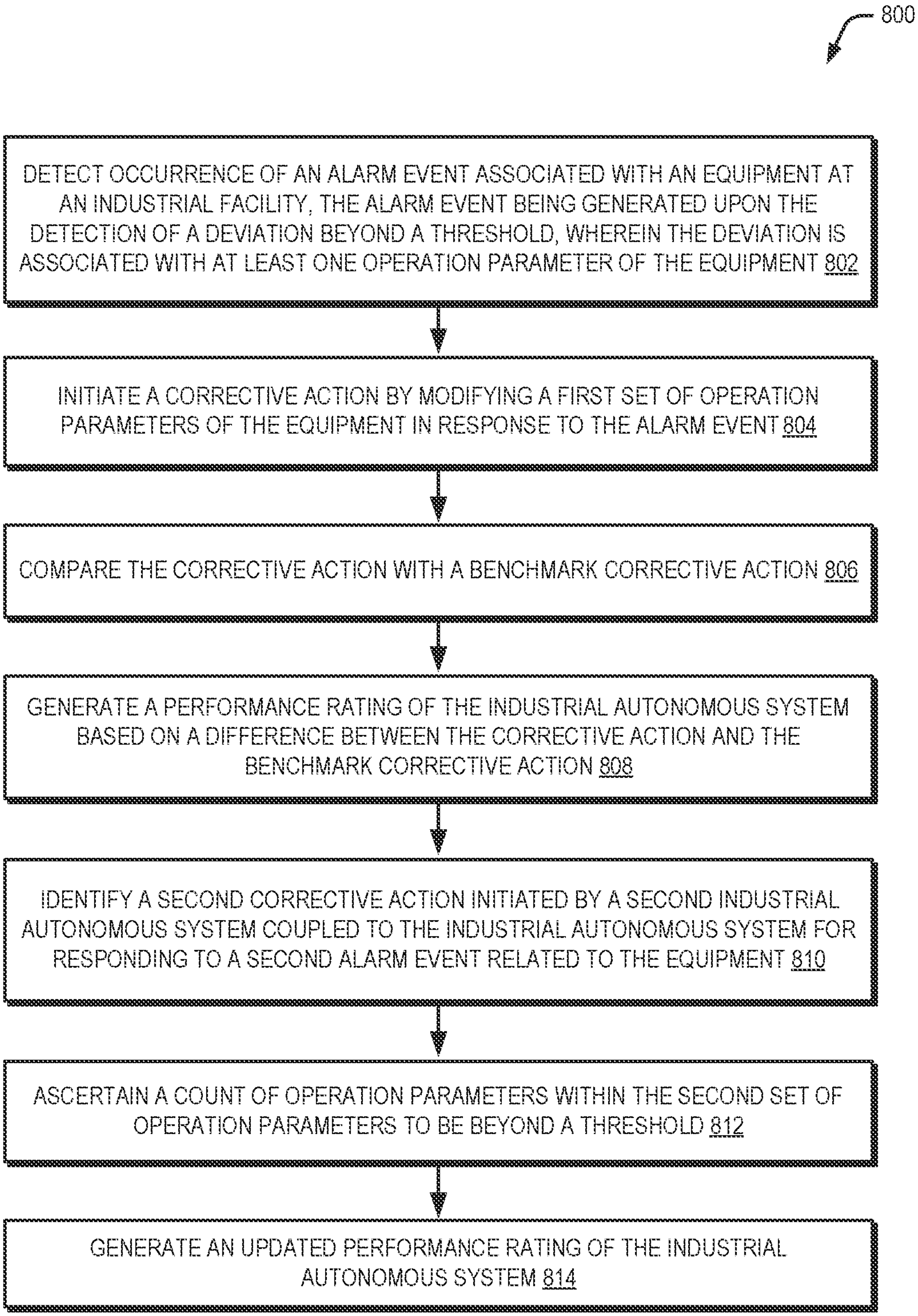

FIGS. 7 and 8 illustrate methods 700 and 800 for evaluating performance of the industrial autonomous system, in accordance with an example of the present subject matter. The order in which the method is described is not intended to be construed as a limitation, and any number of the described method blocks may be combined in any order to implement the methods, or an alternative method. Further, the methods 700 and 800 may be implemented by processing resource or computing device(s) through any suitable hardware, non-transitory machine-readable instructions, or combination thereof.

It may also be understood that methods 700 and 800 may be performed by programmed computing device, such as the industrial autonomous system 102, as depicted in FIG. 1 and FIG. 3. Furthermore, the methods 700 and 800 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 700 and 800 is described below with reference to the industrial autonomous system 102, as described above; other suitable systems for the execution of these methods may also be utilized. Additionally, implementation of the method is not limited to such examples.

In FIG. 7, at block 702, an occurrence of an alarm event is detected, where the alarm event is associated with an equipment at an industrial facility. The alarm event may be generated upon the detection of a deviation associated with an operation parameter of the equipment to be beyond a threshold. In an example, the occurrence of the alarm event may be detected by the detection engine 308 of the industrial autonomous system 102.

At block 704, a corrective action is initiated in response to the alarm event. The corrective action may be initiated by modifying a first set of operation parameters of the equipment. In an example, the corrective action may be initiated by an action engine 310 of the industrial autonomous system 102.

At block 706, the corrective action is compared with a benchmark corrective action. The comparison of the corrective action with the benchmark corrective action may include comparison of the first set of operation parameters to a set of benchmark operation parameters, where the set of benchmark operation parameters corresponds to the benchmark corrective action. In an example, the corrective action is compared with a benchmark corrective action by the analysis engine 312 of the industrial autonomous system 102.

At block 708, a performance rating of the industrial autonomous system is generated. The performance rating is generated based on a difference between the corrective action and the benchmark corrective action. In an example, the performance rating is generated by the analysis engine 314.

At FIG. 8, at block 802, an occurrence of an alarm event is detected, where the alarm event is associated with an equipment at an industrial facility. The alarm event may be generated upon the detection of a deviation associated with an operation parameter of the equipment to be beyond a threshold. In an example, the occurrence of the alarm event may be detected by the detection engine 308 of the industrial autonomous system 102.

At block 804, a corrective action is initiated in response to the alarm event. The corrective action may be initiated by modifying a first set of operation parameters of the equipment. In an example, the corrective action may be initiated by an action engine 310 of the industrial autonomous system 102.

At block 806, the corrective action is compared with a benchmark corrective action. The comparison of the corrective action with the benchmark corrective may include comparison of the first set of operation parameters to a set of benchmark operation parameters, where the set of benchmark operation parameters corresponds to the benchmark corrective action. In an example, the corrective action is compared with a benchmark corrective action by the analysis engine 312 of the industrial autonomous system 102.

At block 808, a performance rating of the industrial autonomous system is generated. The performance rating is generated based on a difference between the corrective action and the benchmark corrective action. In an example, the performance rating is generated by the analysis engine 312.

At block 810, a second corrective action initiated by a second industrial autonomous system coupled to the industrial autonomous system may be identified. The second corrective action may be initiated in response to detection of a second alarm event, where the second alarm event is generated in response to initiation of the corrective action. The second corrective action may be initiated by modifying a second set of operation parameters of the equipment. In an example, the second corrective action may be identified by the detection engine 308.

At block 812, a count of the second set of operation parameters is ascertained to be beyond a threshold. In an example, the count of second set of operating parameters may be ascertained to be beyond the threshold by the action engine 310.

At block 814, an updated performance rating of the industrial autonomous system is generated. The updated performance rating may be generated in response to determining the second set of operation parameters to be beyond the threshold. In an example, the updated performance rating may be generated by the analysis engine 312.

Figure 9:
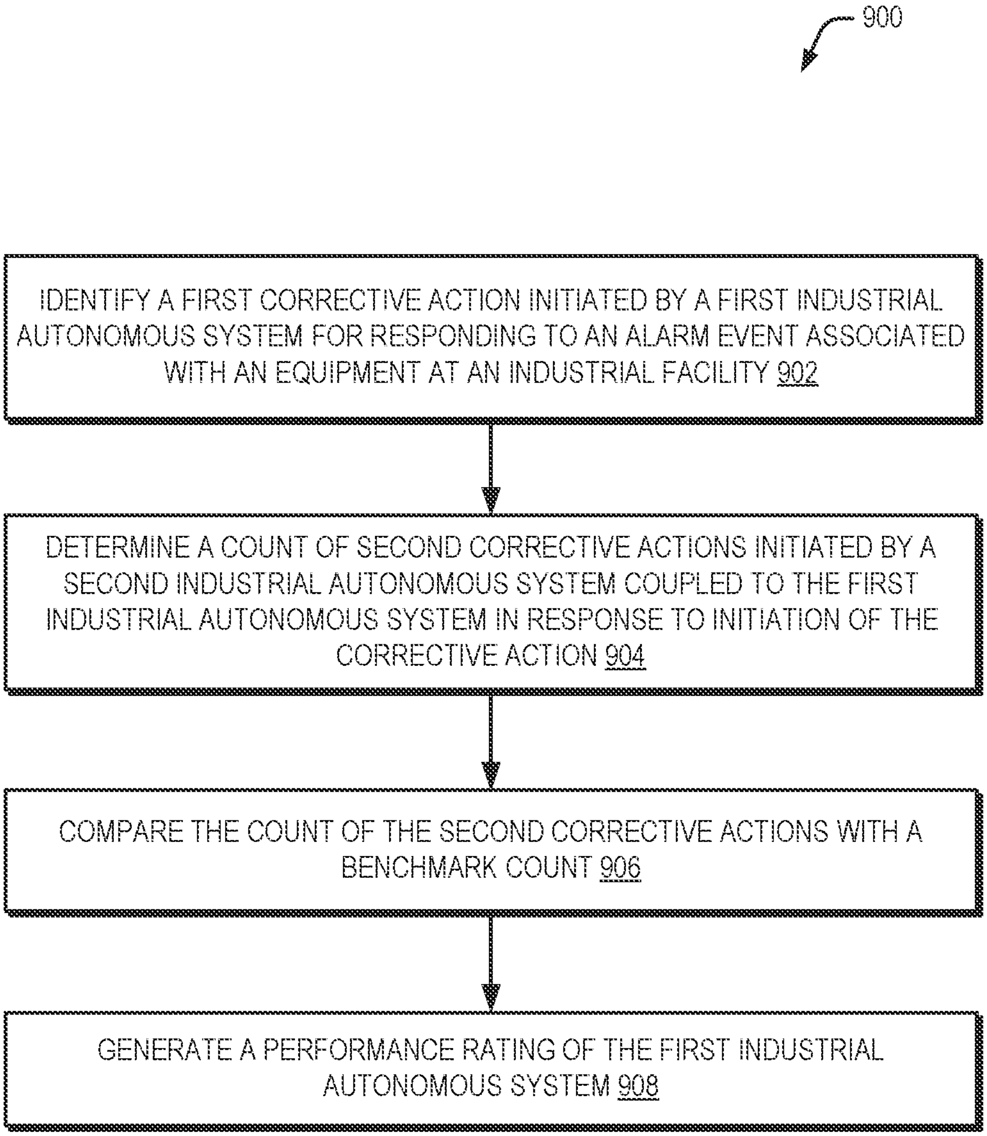
FIG. 9 illustrates a method for evaluating performance of the industrial autonomous system, in accordance with yet another example of the present subject matter.

FIG. 9 illustrates a method 900 for evaluating performance of the industrial autonomous system 102, in accordance with an example of the present subject matter. The order in which the method is described is not intended to be construed as a limitation, and any number of the described method blocks may be combined in any order to implement the methods, or an alternative method. Further, the method 900 may be implemented by processing resource or computing device(s) through any suitable hardware, non-transitory machine-readable instructions, or combination thereof.

It may also be understood that method 900 may be performed by programmed computing devices, such as the performance evaluation system 208, as depicted in FIG. 2 and FIG. 4. Furthermore, the method 900 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 900 is described below with reference to the performance evaluation system 208, as described above; other suitable systems for the execution of these methods may also be utilized. Additionally, implementation of the method is not limited to such examples.

At block 902, a first corrective action initiated by a first industrial autonomous system for responding to an alarm event is identified, where the alarm event is associated with an equipment at an industrial facility. The industrial autonomous system may monitor operation parameters associated with the equipment for detecting occurrence of the alarm event. The alarm event may be generated upon detection of a deviation beyond threshold, where the deviation is associated with at least one operation parameter of the equipment. In response to detection of the alarm event, the first industrial autonomous system may initiate a first corrective action by modifying a first set of operation parameters associated with the equipment. In an example, the first corrective action may be identified by the identification engine 408 of the performance evaluation system 208.

At block 904, a count of second corrective actions initiated by a second industrial autonomous system coupled to the first industrial autonomous system is determined. The second corrective actions may be initiated in response to initiation of the corrective action. In an example, the initiation of the corrective action may lead to occurrence of one or more second alarm events associated with the equipment. In response to occurrence of one or more second alarm events, the second industrial autonomous system may initiate the second corrective actions. In the example, a count of the second corrective actions may be determined. The count of the second corrective actions may be determined by the assessment engine 410 of the performance evaluation system 208.

At block 906, the count of second corrective actions is compared with a benchmark count. The count of the second corrective actions may be compared with the benchmark count by the assessment engine 410.

At block 908, a performance rating for the industrial autonomous system may be generated. The performance rating may be generated based on a difference between the count of second corrective actions and the benchmark count. In an example, the performance rating may be generated by the rating engine 412.

Figure 10:
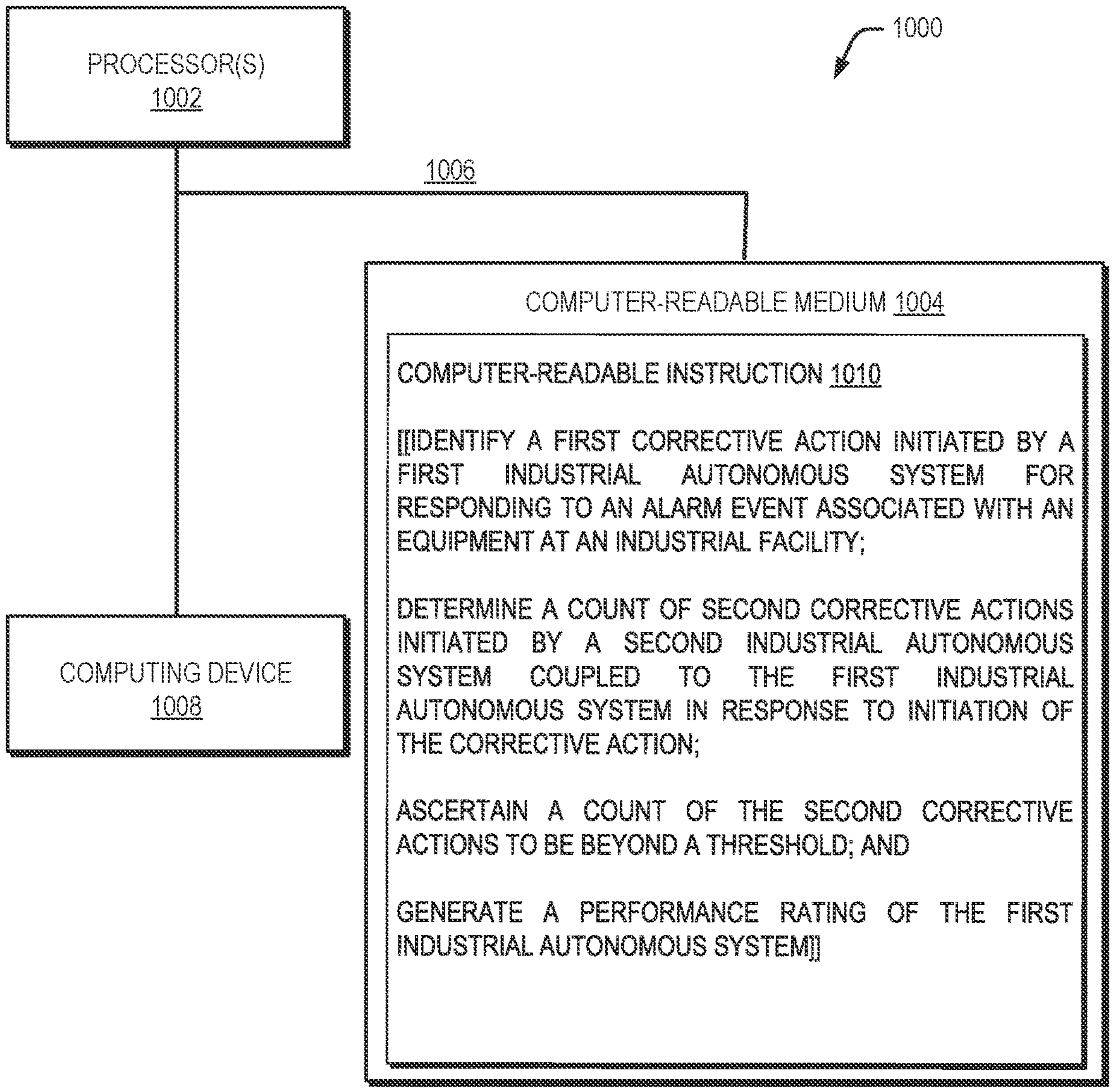
FIG. 10 illustrates a non-transitory computer-readable medium for evaluating performance of an industrial autonomous system, in accordance with an example of the present subject matter.

FIG. 10 illustrates a non-transitory computer-readable medium for evaluating performance of an industrial autonomous system 102, in accordance with an example of the present subject matter.

In an example, the computing environment 1000 includes processor 1002 communicatively coupled to a non-transitory computer readable medium 1004 through communication link 1006. In an example implementation, the computing environment 1000 may be for example, the performance evaluation system 208. In an example, the processor 1002 may have one or more processing resources for fetching and executing computer-readable instructions from the non-transitory computer readable medium 1004. The processor 1002 and the non-transitory computer readable medium 1004 may be implemented, for example, in the performance evaluation system 208.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 1004 includes a set of computer readable instructions 1010 which may be accessed by the processor 1002 through the communication link 1006 and subsequently executed for evaluating performance of the industrial autonomous system 102. The processor(s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to identify a first corrective action initiated by a first industrial autonomous system, such as the industrial autonomous system 102, for responding to an alarm event associated with an equipment at an industrial facility. The first industrial autonomous system may be utilized for monitoring operation parameters associated with the equipment for detecting occurrence of a first alarm event. The alarm event may be generated upon detection of a deviation associated with at least one operation parameter of the equipment to be beyond a threshold. The first corrective action may be initiated in response to the first alarm event. Further, the first alarm event may be initiated by modifying a first set of operation parameters of the equipment.

The instructions 1010 may further cause the processor 1002 to determine a count of second corrective actions initiated by a second industrial autonomous system coupled to the first industrial autonomous system. The second corrective actions may be initiated in response to initiation of the corrective action. In an example, the initiation of the first corrective action may lead to occurrence of one or more second alarm events associated with the equipment. In response to occurrence of one or more second alarm events, the second industrial autonomous system may initiate the second corrective actions. In the example, a count of the second corrective actions may be determined.

Further, the instructions 1010 may cause the processor 1002 to compare the count of the second corrective actions to a benchmark count. The instructions 1010 may further cause the processor 1002 to generate a performance rating based on a difference between the count of the second corrective actions and the benchmark count.

In an example, the instructions 1010 may cause the processor(s) 1002 to compare the first corrective action to a benchmark corrective action. To compare the first corrective action, the instructions may cause the processor 1002 to compare the first set of the operation parameters to a set of benchmark operation parameters, where the set of benchmark operation parameters corresponds to the set of benchmark corrective actions. In the example, the instructions 1010 may cause the processor(s) 1002 to generate an updated performance rating of the first industrial autonomous system based on a difference between the first corrective action and the benchmark corrective action. In another example, the instructions 1010 cause the processor(s) 1002 to receive a response time taken by the industrial autonomous system for initiating the first corrective action. The instructions 1010 further cause the processor(s) 1002 to compare the response time to a benchmark response time. Further, the instructions 1010 cause the processor(s) 1002 to generate an updated performance rating of the first industrial autonomous system.

In yet another example, the instructions 1010 cause the processor 1002 to receive a count of operation parameters within the first set of operation parameters. The instructions 1010 further cause the processor 1002 to compare the count of operation parameters within the first set of operation parameters to a benchmark count of operation parameters. Further, the instructions 1010 cause the processor 1002 to generate an updated performance rating of the industrial autonomous system.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method for evaluating performance of an industrial autonomous system, the method comprising:

detecting, by the industrial autonomous system, an occurrence of an alarm event associated with an equipment at an industrial facility, the alarm event being generated upon the detection of a deviation beyond a threshold, wherein the deviation is associated with an operation parameter of the equipment;

initiating, by the industrial autonomous system, a corrective action by modifying a first set of operation parameters of the equipment, the corrective action being initiated in response to the alarm event;

comparing, by the industrial autonomous system, the corrective action with a benchmark corrective action, wherein benchmark corrective action is indicative of an expected corrective action of the industrial autonomous system in response to the alarm event, the expected corrective action being determined based on historical alarm events; and generating, by the industrial autonomous system, a performance rating of the industrial autonomous system based on a difference between the corrective action and the benchmark corrective action.

2. The method of claim 1, wherein comparing the corrective action comprises comparing the first set of operation parameters to a set of benchmark operation parameters, wherein the set of benchmark operation parameters corresponds to the benchmark corrective action.

3. The method of claim 1, further comprising:

logging a response time taken by the industrial autonomous system for initiating the corrective action;

comparing the response time to a benchmark response time; and generating an updated performance rating of the industrial autonomous system.

4. The method of claim 1, further comprising:

identifying a count of operation parameters within the first set of operation parameters;

comparing the count of operation parameters to a benchmark count; and generating an updated performance rating of the industrial autonomous system.

5. The method of claim 1, further comprising:

identifying a count of operation parameters within the first set of operation parameters modified during a specified time period;

comparing the count of operation parameters to a benchmark count of operation parameters to be modified during the specified time period; and generating an updated performance rating of the industrial autonomous system.

6. The method of claim 1, further comprising:

identifying a second corrective action initiated by a second industrial autonomous system coupled to the industrial autonomous system for responding to a second alarm event related to the equipment, the second corrective action being initiated by modifying a second set of operation parameters of the equipment, and the second alarm event being initiated in response to detection of the corrective action;

ascertaining a count of operation parameters within the second set of operation parameters to be beyond a threshold; and generating an updated performance rating of the industrial autonomous system.

7. The method of claim 1, wherein the deviation is determined based on a maximum deviation of the operation parameter from a specified value during a specified time period.

8. The method of claim 1, wherein the deviation is determined based on a rate of deviation of the operation parameter from a specified value.

9. The method of claim 1, wherein the deviation is determined based on a time period of deviation of the operation parameter.

10. A system to evaluate performance of an industrial autonomous system, the system comprising:

one or more processors;

a memory;

one or more programs stored in the memory, the one or more programs which, when executed by the one or more processors, cause the one or more processors to:

initiate, at the industrial autonomous system, a corrective action in response to an alarm event associated with an equipment at an industrial facility, the industrial autonomous system being utilized for monitoring operation parameters of the equipment and initiating the corrective action by modifying a first set of operation parameters, and the alarm event being generated upon detection of a deviation beyond threshold, wherein the deviation is associated with at least one operation parameter of the equipment;

compare the corrective action with a benchmark corrective action, wherein benchmark corrective action is indicative of an expected corrective action of the industrial autonomous system in response to the alarm event, the expected corrective action being determined based on historical alarm events;

generate a performance rating of the industrial autonomous system based on a difference between the corrective action and the benchmark corrective action; and store, in the memory, the performance rating in association with the alarm event and the corrective action in a mapped relation, for subsequent evaluation of the industrial autonomous system.

11. The system of claim 10, wherein the one or more programs, when executed by the one or more processors, further cause the one or more processors to compare the corrective action with the benchmark corrective action by comparing the first set of operation parameters to a set of benchmark operation parameters, wherein the set of benchmark operation parameters corresponds to the benchmark corrective action.

12. The system of claim 10, wherein the one or more programs, when executed by the one or more processors, further cause the one or more processors to:

receive a response time taken by the industrial autonomous system for initiating the corrective action; and compare the response time to a benchmark response time; and generate an updated performance rating of the industrial autonomous system.

13. The system of claim 10, wherein the one or more programs, when executed by the one or more processors, further cause the one or more processors to:

receive a count of operation parameters within the first set of operation parameters;

compare the count of operation parameters within the first set of operation parameters to a benchmark count of operation parameters; and generate an updated performance rating of the industrial autonomous system.

14. The system of claim 10, wherein the one or more programs, when executed by the one or more processors, further cause the one or more processors to:

receive a count of operation parameters within the first set of operation parameters modified during a specified time period;

compare the count of operation parameters to a benchmark count of operation parameters to be modified during the specified time period; and generate an updated performance rating of the industrial autonomous system.

15. The system of claim 10, wherein the one or more programs, when executed by the one or more processors, further cause the one or more processors to:

identify a second corrective action initiated by a second industrial autonomous system coupled to the industrial autonomous system for responding to a second alarm event related to the equipment, the second corrective action being initiated by modifying a second set of operation parameters of the equipment, and the second alarm event being generated in response to detection of the corrective action;

ascertain a count of the second set of operation parameters to be beyond a threshold; and generate an updated performance rating of the industrial autonomous system.

16. A non-transitory computer readable medium comprising computer-readable instructions that when executed cause a processing resource of a computing device to:

initiate, at a first industrial autonomous system, a first corrective action in response to an alarm event associated with an equipment at an industrial facility, the first industrial autonomous system being utilized for monitoring operation parameters of the equipment and initiating the first corrective action by modifying a first set of operation parameters of the equipment, and the alarm event being generated upon detection of a deviation beyond threshold, wherein the deviation is associated with at least one operation parameter of the equipment;

determine a count of second corrective actions initiated by a second industrial autonomous system coupled to the first industrial autonomous system in response to at least one second alarm event generated in response to initiation of the first corrective action;

compare the count of the second corrective actions to a benchmark count;

generate a performance rating of the first industrial autonomous system, and store the performance rating in association with: (i) the alarm event and the first corrective action, and (ii) the at least one second alarm event and the determined count of the second corrective actions, in a mapped relation, for subsequent evaluation of the first industrial autonomous system.

17. The non-transitory computer-readable medium of claim 16, wherein the instructions cause the processing resource to:

compare the first corrective action to a benchmark corrective action; and generate an updated performance rating of the first industrial autonomous system based on a difference between the first corrective action and the benchmark corrective action.

18. The non-transitory computer-readable medium of claim 17, wherein to compare the first corrective action, the instructions cause the processing resource to compare the first set of the operation parameters to a set of benchmark operation parameters, wherein the set of benchmark operation parameters corresponds to the benchmark corrective action.

19. The non-transitory computer-readable medium of claim 16, wherein the instructions cause the processing resource to:

receive a response time taken by the industrial autonomous system for initiating the first corrective action;

compare the response time to a benchmark response time; and generate an updated performance rating of the industrial autonomous system.

20. The non-transitory computer-readable medium of claim 16, wherein the instructions cause the processing resource to:

receive a count of operation parameters within the first set of operation parameters;

compare the count of operation parameters within the first set of operation parameters to a benchmark count of operation parameters; and generate an updated performance rating of the industrial autonomous system.

* * * * *